US008082058B2

(12) United States Patent
Thompson et al.

(10) Patent No.: US 8,082,058 B2
(45) Date of Patent: Dec. 20, 2011

(54) TAPE LIBRARY WITH LOAD COUNT CONFIRMATION

(75) Inventors: Nathan Christopher Thompson, Boulder, CO (US); Matthew Thomas Starr, Lafayette, CO (US); Michael Jerard Goberis, Broomfield, CO (US)

(73) Assignee: Spectra Logic Corporation, Boulder, CO (US)

( * ) Notice: Subject to any disclaimer, the term of this patent is extended or adjusted under 35 U.S.C. 154(b) by 1015 days.

(21) Appl. No.: 11/927,032

(22) Filed: Oct. 29, 2007

(65) Prior Publication Data
US 2009/0109565 A1   Apr. 30, 2009

(51) Int. Cl.
G06F 7/00   (2006.01)
(52) U.S. Cl. ......................................... 700/214; 360/69
(58) Field of Classification Search .................. 700/214; 360/69
See application file for complete search history.

(56) References Cited

U.S. PATENT DOCUMENTS

| | | | |
|---|---|---|---|
| 6,425,042 B1 | 7/2002 | Ikeda et al. | |
| 7,609,471 B2 * | 10/2009 | Hood et al. | 360/69 |
| 2004/0105187 A1 | 6/2004 | Woodruff et al. | |
| 2004/0223253 A1 | 11/2004 | Woodruff et al. | |
| 2004/0264037 A1 | 12/2004 | Downey et al. | |
| 2004/0264038 A1 | 12/2004 | Heineman et al. | |
| 2004/0264039 A1 | 12/2004 | Armagost et al. | |
| 2004/0264040 A1 | 12/2004 | Armagost et al. | |
| 2004/0264041 A1 | 12/2004 | Kumpon et al. | |
| 2004/0264042 A1 | 12/2004 | Pollard et al. | |
| 2005/0007692 A1 | 1/2005 | Thompson et al. | |
| 2005/0052772 A1 * | 3/2005 | Barbian et al. | 360/69 |
| 2006/0164928 A1 | 7/2006 | Starr et al. | |
| 2007/0195447 A1 * | 8/2007 | Starr et al. | 360/72.1 |
| 2008/0037160 A1 * | 2/2008 | McIntosh et al. | 360/88 |

OTHER PUBLICATIONS

U.S. Appl. No. 11/412,585, filed Apr. 27, 2006, Starr et al.
The seventh edition of the *IBM TotalStorage LTO Ultrium Tape Drive SCSI Reference* (Jun. 2007).
The first edition of the *IBM Setup, Operation, and Service Guide to IBM TotalStorage 3580 Tape Drive Model L33/L3H, Reference* (Dec. 2004).

* cited by examiner

Primary Examiner — Ramya Prakasam
(74) Attorney, Agent, or Firm — Kenneth Altshuler

(57) ABSTRACT

A data storage library is described including a tape cartridge possessing an auxiliary memory device adapted to maintain a load count that is incremented whenever the tape cartridge is loaded in a tape drive. The library also includes, a library tape drive adapted to increment the load count every time the tape cartridge is loaded in the library tape drive, an auxiliary storage device capable of maintaining knowledge of the incremented load count only from when the tape cartridge is loaded with the library tape drive, and an auxiliary memory device reader capable of reading the load count from the auxiliary memory device. The library further includes a processing device adapted to receive and compare the knowledge maintained in the auxiliary storage device with the load count from the auxiliary memory device that is read via the auxiliary memory device reader that if different, the processing device is capable of transmitting a notification to an end user.

20 Claims, 12 Drawing Sheets

TAPE LIBRARY WITH LOAD COUNT CONFIRMATION

CROSS-REFERENCE TO RELATED APPLICATIONS

None.

BACKGROUND OF THE INVENTION

1. Field of the Invention

The present invention relates generally to tape libraries using auxiliary memory devices contained in tape storage cartridges to confirm expected load count from known tape drives.

2. Description of Related Art

Data storage libraries, such as tape libraries, are typically used to store and retrieve large amounts of data for data manipulation and archiving purposes. These libraries are generally comprised of drive devices adapted to read and write data to and from tape cartridges that are often housed within the tape libraries. In the interest of obtaining cursory information about a specific tape cartridge without requiring a time-consuming media load and tape threading process to read the on-tape index file, techniques using holes arranged in patterns in the cartridge casing and later electrical pads grounded in a variety of combinations were introduced. The holes and/or electrical pads provided simple information such as tape capacity, manufacturer, etc. Today, these techniques are yielding to the introduction of Radio Frequency chips disposed in the tape cartridges called a Memory-In-Cartridge (MIC) or Medium Auxiliary Memory (MAM), because of increased amounts of information and ease of use. FIG. 1A shows an example of a tape cartridge 100, tape medium 102, and MIC 104, shown here in dashed lines because the MIC 104 and tape medium 102 reside in the interior of the cartridge 100. In this example, the MIC is disposed in an LTO-3 cartridge which can be provided by TDK Corp. of Tustin, Calif.

A MIC allows the tape drive to access valuable cartridge data without the use of a physical connection, reducing connector wear for both the drive and the media. The MIC is a memory chip built into the data cartridge that provides a direct and immediate connection to the drive's on-board processors, which speeds access to information related to the data cartridge such as system logs, for example. Information and file search parameters are formatted within the MIC system effectively cutting the data access time down to a fraction from historical techniques.

As shown in FIG. 1B, a MIC 104 fundamentally comprises an integrated circuit that includes solid state memory and a transponder 124 attached to an antenna 126, the antenna is typically a small coil of wires. The MIC 104 is considered a passive device because it is energized when subjected to a strong enough RF field produced by a MIC-Reader. Information can be transmitted between the MIC and the MIC-Reader via a specific radio frequency.

Currently a MIC, or MAM, is parceled into regions for a medium, device and host. The three regions can accommodate attributes related to a medium with a MIC. For example a medium attribute can be a serial number permanently stored in the MAM during manufacturing, a device attribute can be load count maintained by the tape drive, which is done automatically by an LTO-3 tape drive from IBM, and a host attribute can be a backup date maintained by the application client. These attributes are strictly used by original equipment manufacturers and for performing failure analysis.

In an effort to expand capabilities of a storage element containing a MIC operable with the intention of improving data security and of notifying an authority of stolen data or suspicious activity directed to one or more tape cartridges in a library or network, both methods and apparatus are disclosed herein. It is to innovations related to this subject matter that the claimed invention is generally directed.

SUMMARY OF THE INVENTION

The present invention relates generally to tape libraries using auxiliary memory devices contained in tape storage cartridges to confirm expected load counts from known tape drives overcoming the disadvantages and limitations of the prior art by making comparisons of expected load encounters of specific tape cartridges with known tape drives versus actual load encounters with both known and unknown tape drives.

One embodiment of the present invention can therefore comprise a first tape library comprising: a tape cartridge possessing an auxiliary memory device adapted to maintain a load count that is incremented whenever the tape cartridge is loaded in a tape drive; at least one library tape drive adapted to increment the load count every time the tape cartridge is loaded in the at least one library tape drive; an auxiliary storage device capable of maintaining knowledge of the incremented load count only from when the tape cartridge is loaded with the at least one library tape drive; an auxiliary memory device reader capable of reading the load count from the auxiliary memory device; a processing device adapted to receive and compare the knowledge maintained in the auxiliary storage device with the load count from the auxiliary memory device that is read via the auxiliary memory device reader and if different the processing device is capable of transmitting a notification to an end user.

Other embodiments of the present invention may additionally comprise a tape library comprising: a first tape drive and a second tape drive; a tape cartridge possessing an auxiliary memory device adapted to maintain a load count that is incremented whenever the tape cartridge is loaded in the first tape drive, the second tape drive or a third tape drive independent of the tape library; a means for maintaining knowledge of the load count from only the first tape drive and the second tape drive; a means for comparing the knowledge with the load count from the auxiliary memory device; a means for generating a user specified action when the knowledge is not identical to the load count from the auxiliary memory device; and a means for executing the user specified action.

Yet further embodiments of the present invention may comprise a method comprising steps of: providing a second library possessing a second tape drive and a first library possessing: a) a first tape drive, b) a tape cartridge possessing an auxiliary memory device with a load count of n loads, c) an auxiliary storage device, d) an auxiliary memory device reader; loading the tape cartridge in the first tape drive and recording to the auxiliary memory device n+1 loads; unloading the tape cartridge from the first tape drive; recording the n+1 loads to the auxiliary storage device; loading the tape cartridge in the second tape drive and recording to the auxiliary memory device n+2 loads; unloading the tape cartridge from the second tape drive; reading the n+2 loads from the auxiliary memory device via the auxiliary memory device reader; comparing the n+1 loads from the auxiliary storage device with the n+2 loads from the auxiliary memory device; determining that there is a discrepancy between the loads from the auxiliary storage device and the auxiliary memory device; generating a user specified action in response to the discrepancy.

DETAILED DESCRIPTION

Figure 2A:
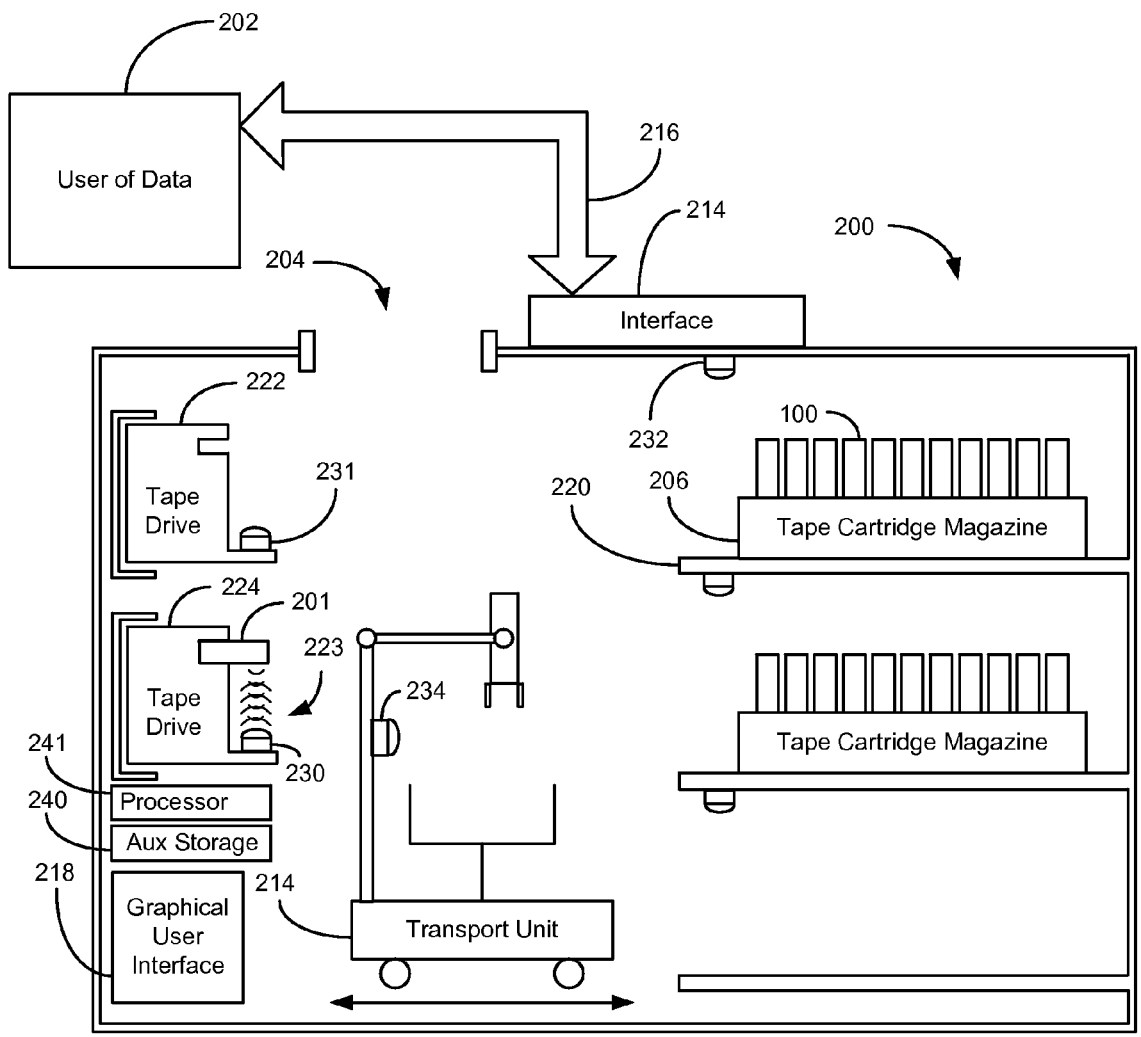
FIG. 2A is an illustration of a tape library arrangement in accordance with an embodiment of the present invention.

Referring to the drawings in general, and more specifically to FIG. 2A, shown therein is an illustration of a data storage arrangement constructed in accordance with an embodiment of the present invention. In what follows, similar or identical structures may be identified using identical callouts.

Figure 1A:
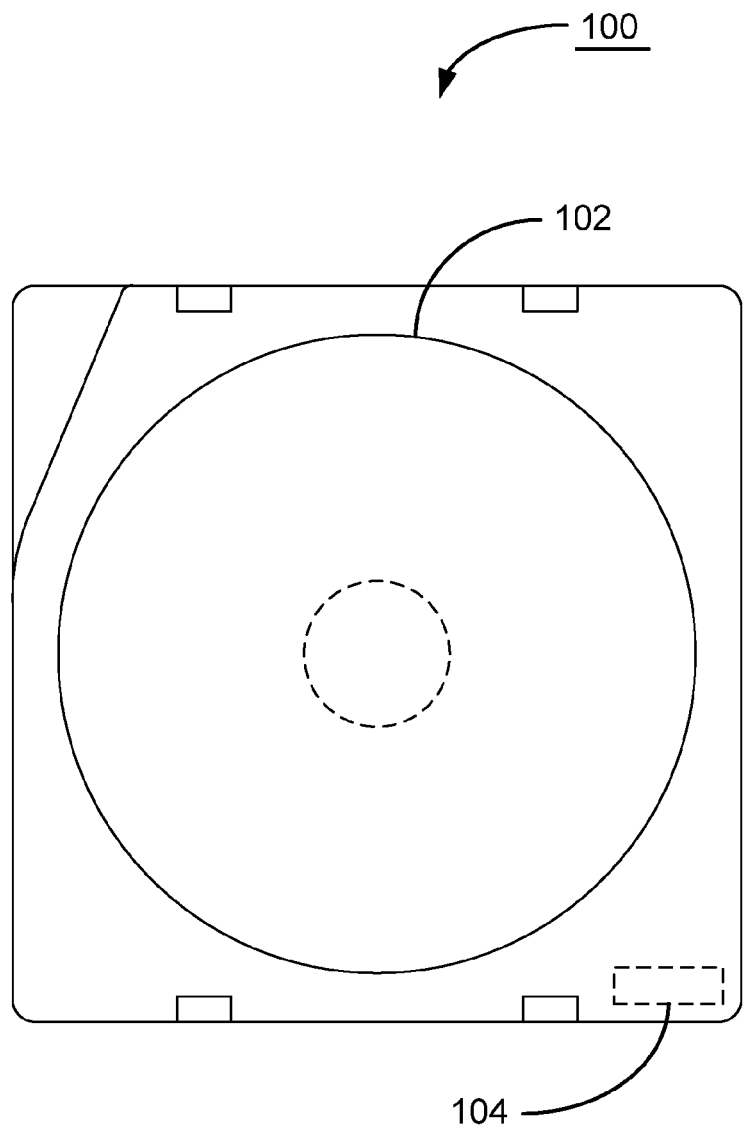
FIG. 1A is a prior art pictorial representation of a tape cartridge with an auxiliary radio frequency memory device.
Figure 1B:
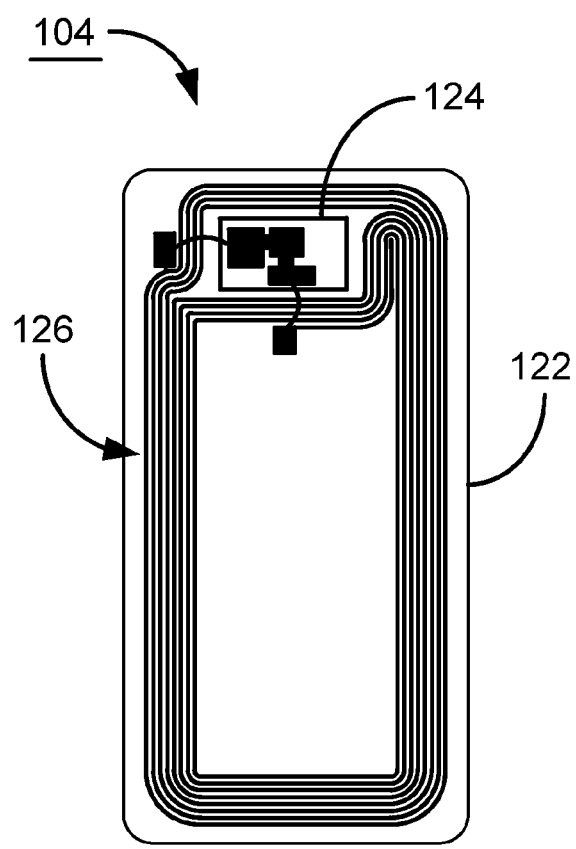
FIG. 1B is a prior art pictorial representation of an auxiliary radio frequency memory device.

The data storage arrangement illustrated in FIG. 2A can comprise a user of data 202, such as a client, in communication 216 with a data storage library 200. As illustratively shown, the client 202 is in communication with the library 200 via the communication path 216 and the library interface device 214. The library 200 comprises a plurality of tape cartridges 100 disposed in a tape cartridge magazine 206 wherein each of the tape cartridges contains an auxiliary radio frequency memory device (not shown), such as the MAM 104 of FIG. 1B, capable of retaining auxiliary digital data. In alternative embodiments, the tape cartridges 100 can be disposed on shelves instead of magazines 206, as will be discussed in conjunction with FIG. 3A-3C. An auxiliary radio frequency memory device 104 associated with a tape cartridge, such as the cartridge 100 or 201, for example, may be identified throughout the detailed description as element 104 even though it is considered to be contained by a cartridge and hence may not be viewable in a specific figure exemplifying embodiments of the present invention. Hence, the identification of element 104 for illustrative purposes, herein. In this embodiment, the library 200 also comprises several tape drives 222 and 224, each capable of reading user data from and writing user data to one of the plurality of tape cartridges 100. User data herein is considered data from a source such as the user of data 202 that is stored on the tape medium 102, of FIG. 1A. Each tape drive 222 and 224 can be associated with a tape drive radio frequency memory device reader and writer 231 and 230, respectively as shown. Each tape drive 222 and 224 is further capable of transmitting load count to an auxiliary radio frequency memory device 104 via the tape drive radio frequency memory device 230, for example. An example of a loaded tape drive is the tape cartridge 201 inserted in the tape drive 224 in a cooperating reading and writing relationship where user data can be stored and read from the tape medium 102 contained substantially by the cartridge 201. As shown here, the loaded tape drive 224 is also in radio frequency communication 223 with the auxiliary radio frequency memory device 104 associated with tape cartridge 201 via the tape drive radio frequency memory device 230 associated with tape drive 224. The tape drive 224 (as well as 222) is capable of transmitting load count to the auxiliary radio frequency memory device 104 associated with the tape cartridge 201 via the tape drive radio frequency memory device reader and writer 230. The auxiliary storage location 240 can accommodate information, such as the load count, from a plurality of auxiliary radio frequency memory devices 104 each contained in an associated tape cartridge 100. The load count from any auxiliary radio frequency memory device 104 can be compared with the load count from the associated tape cartridge 201 as stored in the auxiliary storage device 240 via the processor device 241.

The library 200 can further comprise a shelving system 220 capable of archiving the tape cartridge magazines 206 within the library 200. In this embodiment, the shelving system 220 is associated with one or more auxiliary radio frequency memory device readers 232 that is at least capable of reading data, such as the load count information, stored on an auxiliary radio frequency memory device 104 contained by each tape cartridge 100. A transport unit 214 comprises means to transport a tape cartridge magazine 206 from the shelf system 220 to a location that facilitates a tape cartridge 100 to be inserted in one of the drives 222 or 224, such as tape cartridge 201 in a cooperating relationship with drive 224 to read and write data as shown. The transport device 214 can optionally be associated with at least one auxiliary radio frequency memory device reader 234, as shown here, disposed on the transport unit 214. The library 200 also optionally comprises an entry/exit port 204 whereby tape cartridges 100 or tape cartridge magazines 206 can be transferred between an environment external to the library 200 and an environment internal to the library 200. The auxiliary radio frequency memory device readers 232 and 234 are independent of the tape drive radio frequency memory device 230, that is, devices 232 and 234 are disposed in a location independent of a tape drive, that is, not associated with a tape drive. In this embodiment, the library 200 can accommodate a graphical user interface 218 and an auxiliary memory 240, such as a disk drive or solid state memory device, capable of retaining (storing) relevant information related to each tape 100, such as that which is stored on an auxiliary radio frequency memory device 104. In one embodiment, the tape cartridges 100 or the tape cartridge magazines 206 may be associated with different user of data such that the storage space in the library 200 is partitioned into two or more parts wherein each part is associated with the different user of data for example.

Figure 2B:
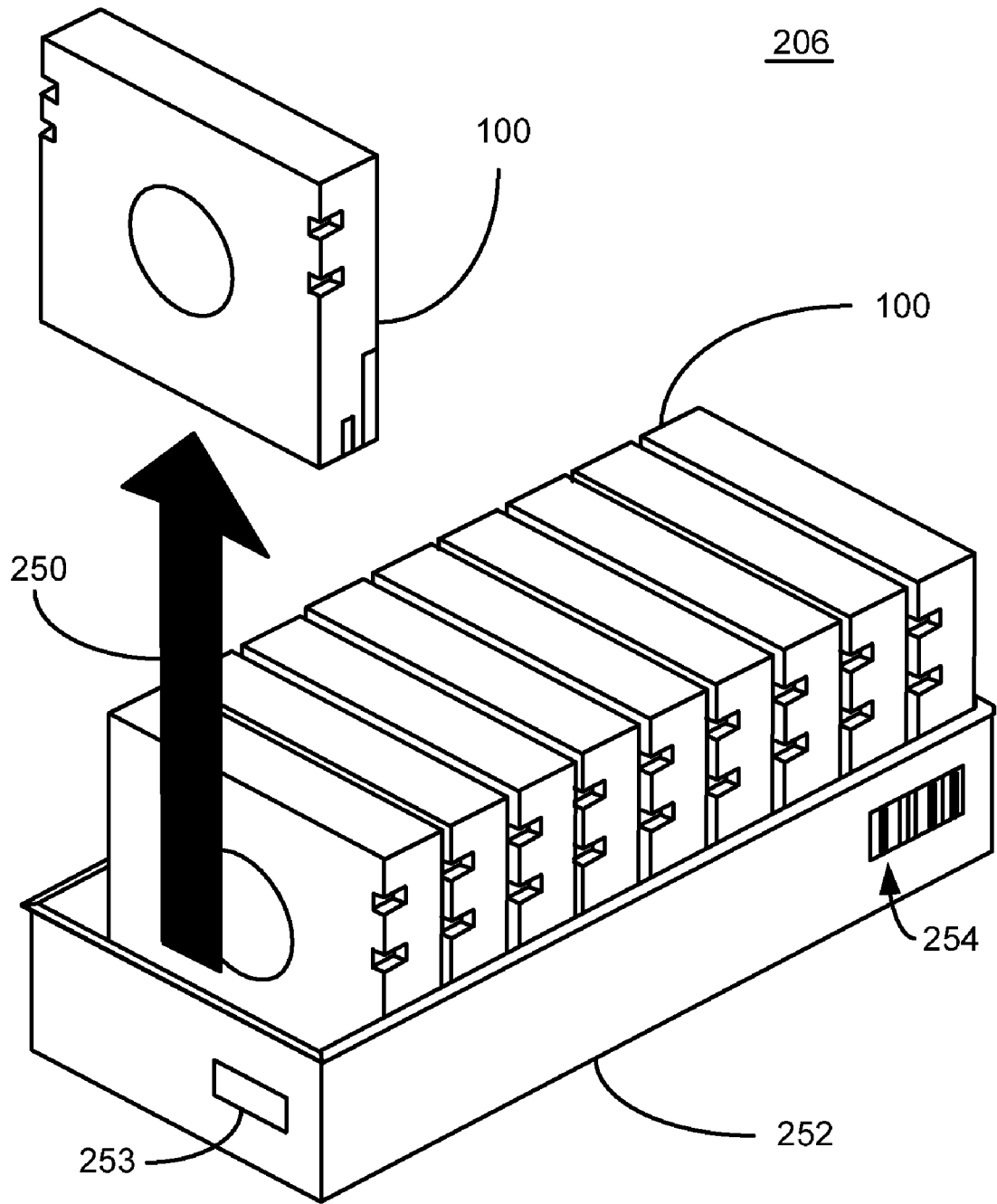
FIG. 2B is an illustration of a populated tape cartridge magazine in accordance with an embodiment of the present invention.

With reference to FIG. 2B, shown therein are tape cartridges 100 supported by a tape cartridge magazine 206. In more detail, a tape cartridge 100, such as an LTO-3 category tape cartridge manufactured by IBM, comprises magnetic tape that is capable of storing digital data written by a compatible drive 220 or 224, such as an LTO-3 tape drive manufactured by IBM, when in cooperation to read and write data (i.e. loaded) with the tape cartridge 201 as shown in FIG. 2A. The tape cartridge magazine 206 is shown populated with a plurality of tape cartridges 100. A tape cartridge 100 can be removed from the tape cartridge magazine 206, as shown by the arrow 250, and inserted in to the tape drive 220 or 224 by means of a picker device 502, shown in FIG. 5. Disposed on the tape cartridge magazine 252 is a bar code identifier 254 for identifying the tape cartridge magazine 206 which has utility should the tape cartridge magazine 206 be archived in a media pack storage vault, for example. In this embodiment, all tape cartridges 100 contain an auxiliary radio frequency memory device 104, however, in alternative embodiments, some tape cartridges may not contain an auxiliary radio frequency memory device 104. In another embodiment of the present invention, the magazine 206 can comprise a magazine auxiliary memory device 253 that is capable of containing information from at least one of the data cartridges 100 the magazine 252 supports. The magazine auxiliary memory device 253 can receive information from the auxiliary radio frequency memory devices 104 contained by each tape cartridge 100 via one or more auxiliary radio frequency memory device readers 232 or 234, for example. Information from the auxiliary radio frequency memory devices 104 can be read and immediately transmitted to the magazine auxiliary memory device 253, or alternatively, the information of each auxiliary radio frequency memory devices 104 can be stored on the auxiliary storage device 240 and then transferred to the magazine auxiliary memory device 253, just to name two examples. In oner embodiment, the magazine auxiliary memory device 253 can possess load count of every tape cartridge 100 associated with the magazine 206, which can serve a redundancy to the auxiliary storage device 240, of FIG. 2A.

An auxiliary radio frequency memory device 104, in one embodiment, is parceled into three regions in which data can be stored; a medium device region which contains information such as a serial number, a device region which contains information from the tape drive such as load count, and host/vendor unique region wherein information such as history and/or performance data related to the cartridge 100 can be stored. The information in the regions can be added to with new information via an address related to the arrangement of available storage space in the auxiliary radio frequency memory device 104 or, optionally, the information can be read by an auxiliary memory reader, such as the reader 230, and reassembled with additional information and stored on the auxiliary radio frequency memory device 104 as the reassembled version, just to name two examples. In another example, if the storage limit is reached in the auxiliary radio frequency memory device 104, such as the host/vendor data in the host/vendor unique region, the host/vendor data can be read and stored in an auxiliary storage space, such as the auxiliary memory 240, and the host/vendor unique region purged and made available for new information. In another example, the host/vendor data can be compressed with algorithms to decompress residing in the library 200 or user of data 202, for example.

Figure 3A:
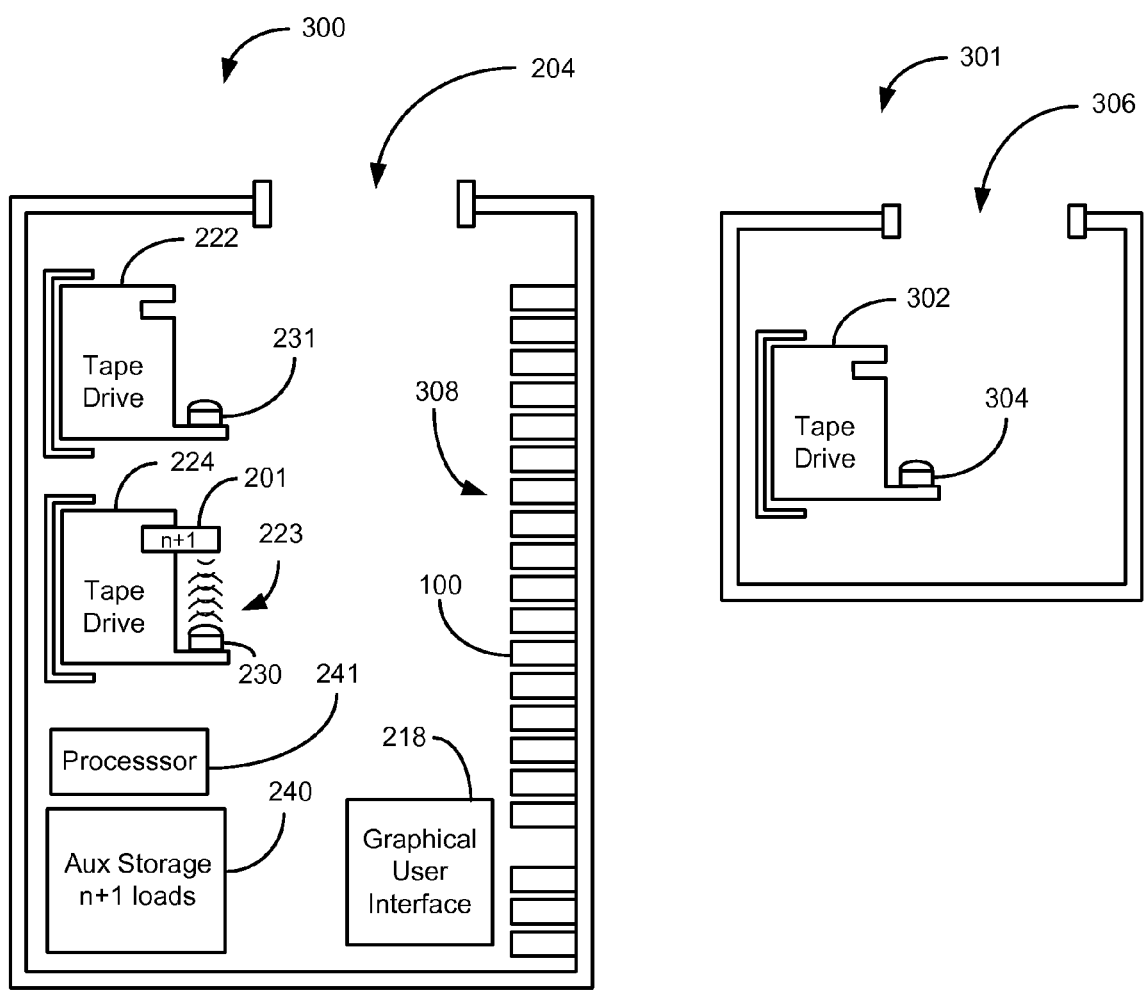
FIG. 3A-3C are illustrations of a tape cartridge incrementing load count when loaded in tape drives in accordance with an embodiment of the present invention.

With reference to FIG. 3A, shown therein is an illustration of a first tape library 300 and a second tape library 301 possessing a tape drive 302 according to some embodiments of the present invention. As shown, the first tape library 300 comprises a tape cartridge 201 possessing an auxiliary memory device 104 that is maintaining a load count of "n+1" loaded in a first tape drive 224. The first tape drive 224 possesses an auxiliary memory device reader and writer 230. The library 300 also possesses a second tape drive 222 with an associated auxiliary memory device reader and writer 231. The second tape drive 222 is not currently loaded with a tape cartridge 100. The library 300 also comprises a processing device 241 that is linked to both of the first and second tape drives 224 and 222 respectively and the auxiliary storage device 240. The first library 300 also possesses a graphical user interface 218 linked to the processor device 241 and, in one embodiment the auxiliary storage device 240. The first library 300 also provides a shelf system 308 wherein tape cartridges 100 are moveably disposed. The load count associated with the tape cartridge 201 is incremented by "one" each time the medium in a tape cartridge is threaded in a tape drive, such as the drive 224. In some cases, the load count is increased by "one" increment when the tape cartridge 100 has finished recording user data and is ready to be ejected. In either case, when the tape cartridge 201 is loaded in the tape drive 224, the auxiliary memory device reader and writer 230 transmits an RF signal 223 that increments the load count maintained in the auxiliary memory device 104 from "n" to "n+1". The incremented load count of "n+1" is also transmitted to the auxiliary storage device 240 wherein the load count information of "n+1" is maintained. In one illustrative embodiment regarding a new tape cartridge 10; in the event the new tape cartridge 100 is introduced to the library 300, an associated tape cartridge identification, such as a bar code, is logged into a library memory device, such as the auxiliary storage device 240, for example. Hence, if the load count on a newly introduced tape cartridge 100 is "0", the load count of "0+1", or "1" corresponding to the newly introduced tape cartridge 100 is stored in the auxiliary memory device 240 when loaded in the tape drive 224 for the first time. If the load count is "150" and from a different library, and the tape cartridge has no history of being in the library 300, then the tape cartridge's identity is logged in the library 300 and the load count of "150+1", or "151" is stored in the auxiliary memory device 240 when loaded with the tape drive 224 for the first time. In this example, the tape cartridge 201 is considered newly introduced into the library 300 and thus the load count of "n+1" is the first load count entry associated with the tape cartridge 201.

In an optional embodiment, the original load count of "n" associated with an incoming cartridge 100 may also be also stored, however, in the example of FIG. 3A, this is not the case. Hence, if the load count on a newly introduced tape cartridge 100 is "0", the load count of "0" corresponding to the newly introduced tape cartridge 100 is stored in the auxiliary memory device 240. If the load count is "150" and from a different library, and the tape cartridge has no history of being in the library 300, then the tape cartridge's identity is logged in the library 300 and the load count of "150" is stored in the auxiliary memory device 240.

Figure 3B:
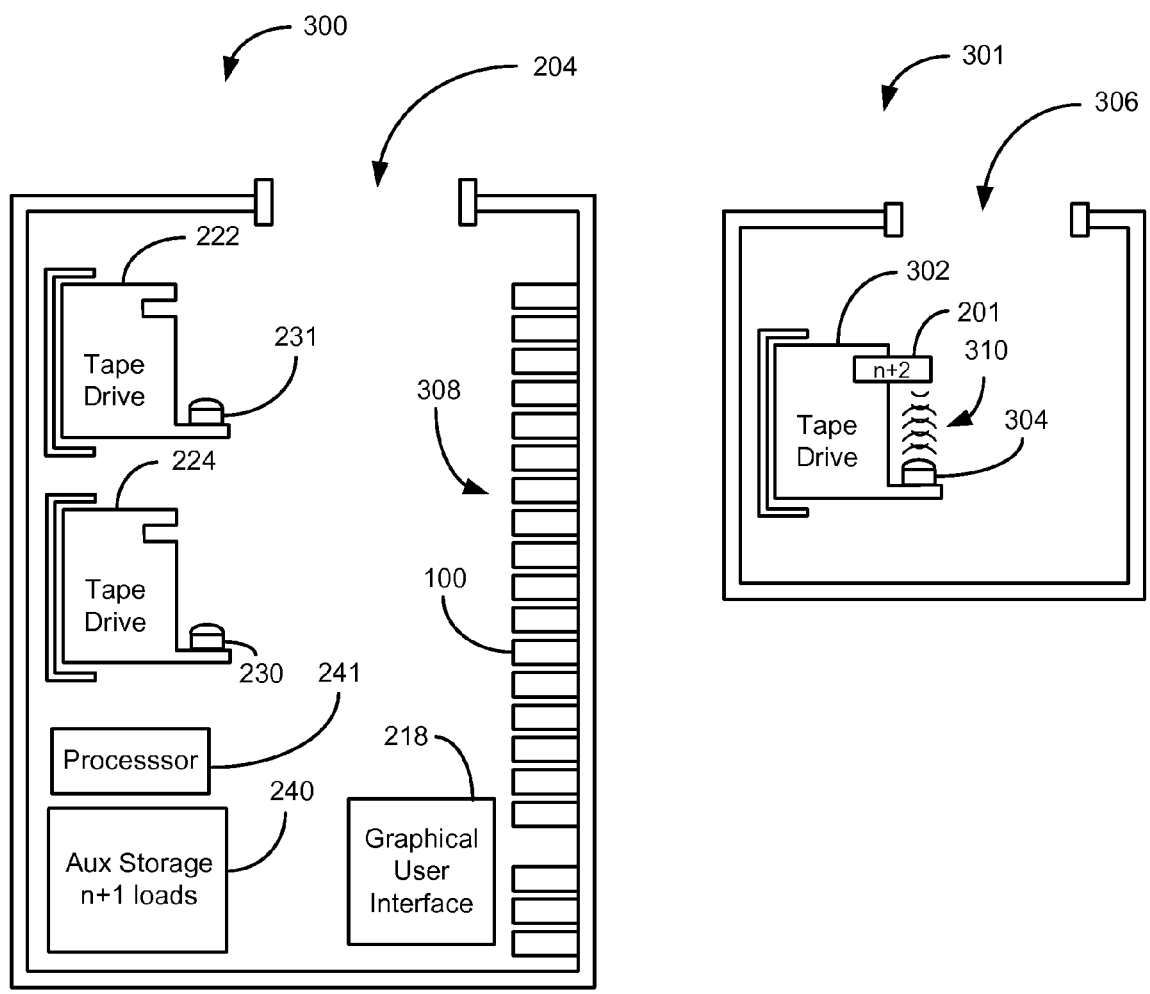

With reference to FIG. 3B, shown therein is the first library 300 and second library 301 wherein the tape cartridge is disposed in the second library 301. The tape cartridge 201 can be introduced to the second library 301 via the entry/exit port 306. As illustratively shown, the tape cartridge 201 is loaded in the tape drive 302, the auxiliary memory device reader and writer 230 is shown transmitting an RF signal 310 that increments the load count maintained in the auxiliary memory device 104 from "n+1" to "n+2". In tape drives, such as an IBM LTO-3 drive, the load count is incremented as a matter of routine; hence, unless tampered with, the tape drive 302 will automatically increment the load count on the tape drive 201. In an optional embodiment, the tape drive 302 does not have to be housed in the second library 301, but rather, can be a stand-alone drive not associated with any library without departing from the scope and spirit of the present invention.

Figure 3C:
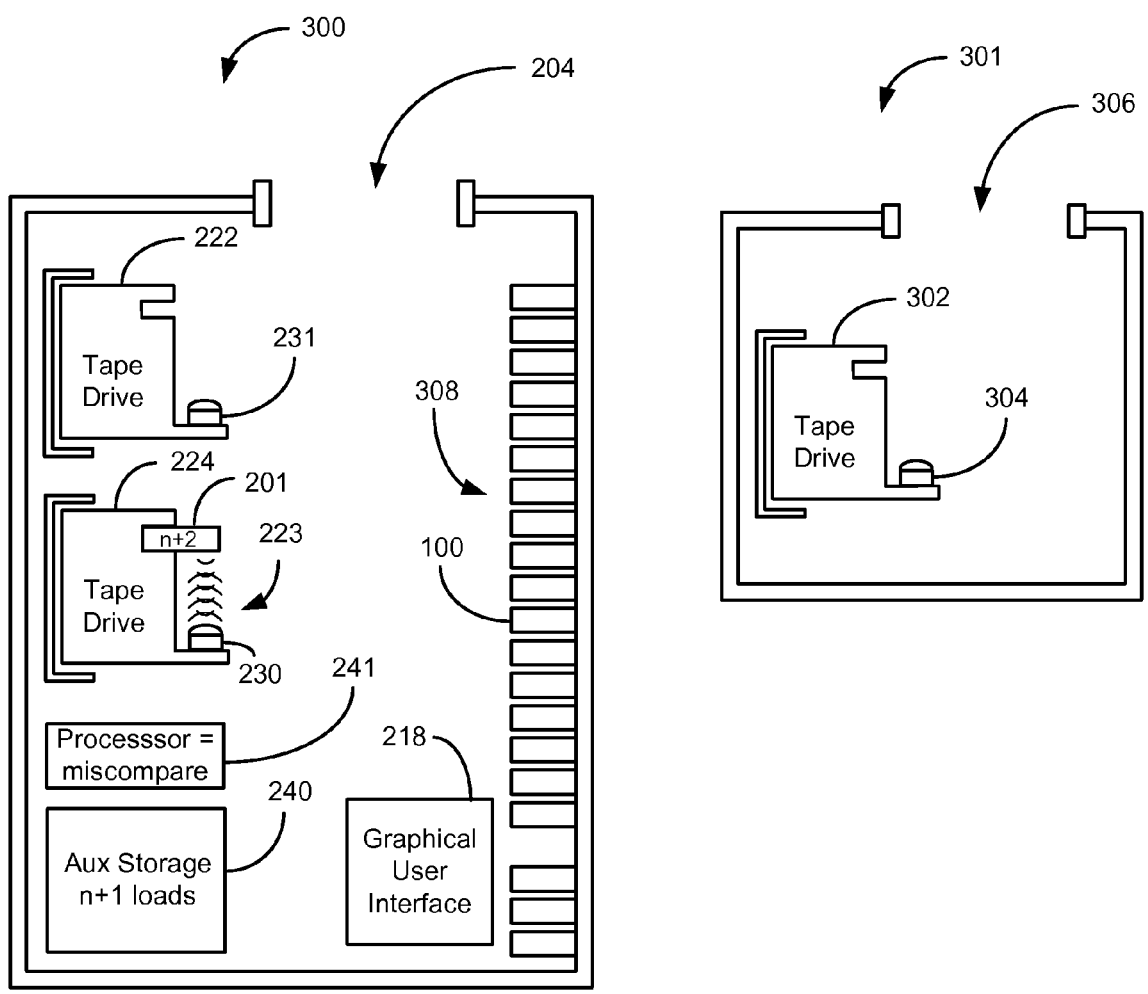

FIG. 3C illustrates the tape cartridge 201 once again located in the first tape library 300. As shown, the tape cartridge 201 is disposed in the first tape drive 224. The load count "n+2" is read from the auxiliary memory device 104 associated with the tape cartridge 201 via the auxiliary memory device reader and writer 230 and transmitted to the processor device 241 wherein the processor device 241 receives the load count "n+1" from the auxiliary storage device 240 for comparison. Because the load count of "n+2" is not identical to the load count of "n+1" maintained by the auxiliary storage device 240, a miscompare is determined. The load count of "n+2" can equally be determined from the second tape drive 222 via the auxiliary memory device reader and writer 231, if the tape cartridge 201 was disposed in the second tape drive 222 because the second tape drive 222 is a known tape drive associated with the first library 300. In one embodiment, the processor device 241 generates a user specified action in response to the numerical discrepancy of "n+1" to "n+2". A user specified action can be generated and executed by the processor device 241, or optionally an alternative device associated with the first library 300 capable of performing the function. A user specified action is an action that a user of data 202, or an operator, for example, defines provided the load count on a specific tape cartridge does not compare with the load count record maintained in the auxiliary storage device 240. A user specified action can include preventing the tape cartridge 201 from leaving the library 300, such as by locking down the library 300 by preventing access to the entry/exit port 204, informing an end user, such as the user of data 202, that the load count from the auxiliary storage device 240 is not identical to the load count from the auxiliary memory device 104 and let the user of data 202 decide what to do next, disabling any user data stored on the tape cartridge 201, such as by eliminating access to an encryption key if the user data is encrypted, for example, or simply activating an audible and/or visual alarm alerting a user of data, or other authority, that the tape cartridge 201 has been loaded in a tape drive other than the authorized tape drives 222 and 224 associated with the first library 300. In the event, a notification is sent to an end user, such as a user of data 202, the notification may be arranged to contain information that the tape cartridge 201 has been read by an external tape drive that is not associated with the first library 300. Such a notification can be viewable on a display device, such as a monitor, accessible to the user of data 202. Optionally, the notification can be viewable on the graphical user interface 218 associated with the first library 300.

Figure 4:
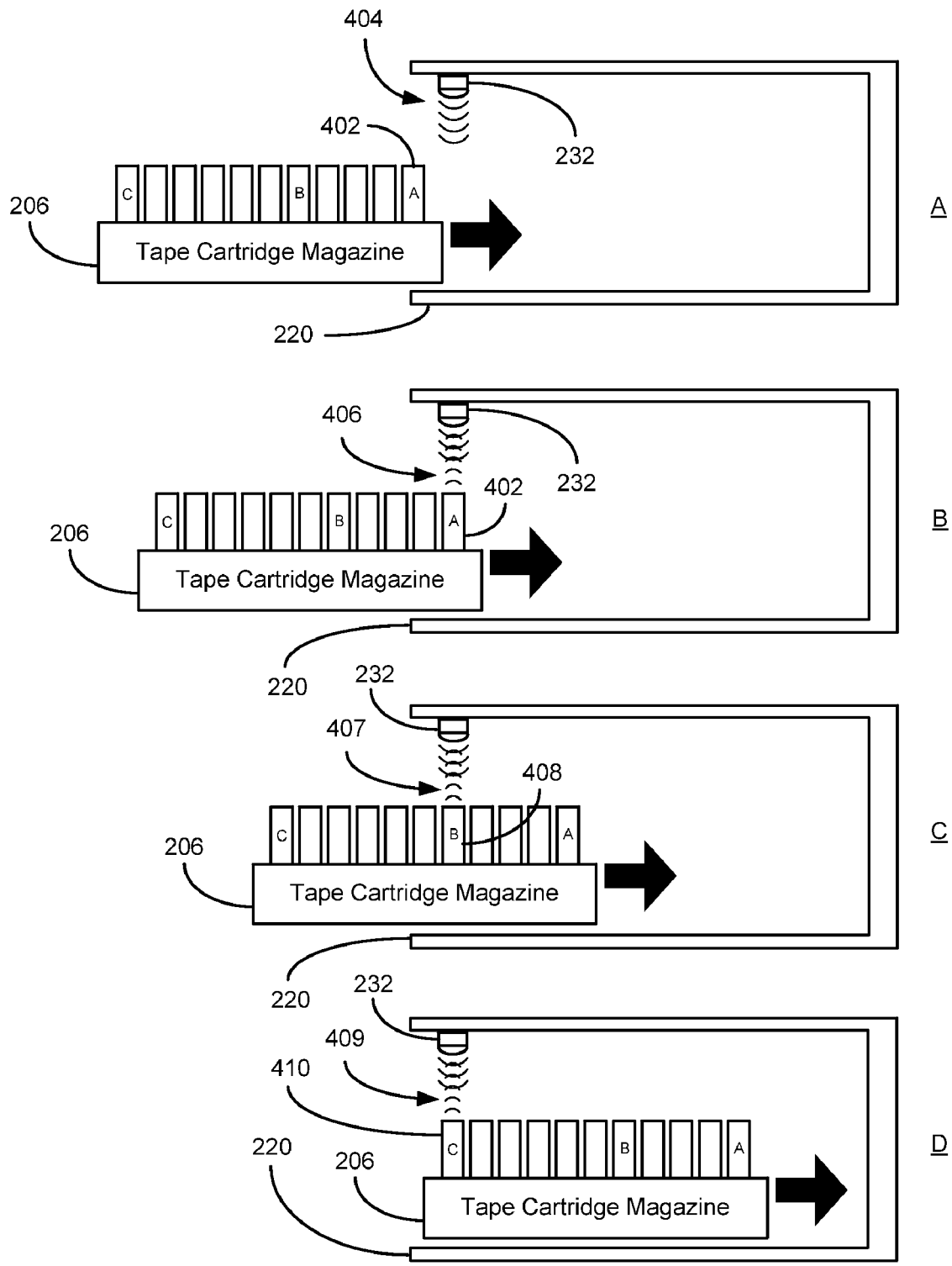
FIG. 4 is an illustration an embodiment of a shelf system that comprises an auxiliary memory reader that can be used in combination with a loaded tape cartridge magazine in accordance with an embodiment of the present invention.

FIG. 4 illustrates an embodiment of a shelf system 220 that comprises an auxiliary memory reader 232 that can be used in combination with a loaded tape cartridge magazine 206. As illustratively shown in arrangement-A, the tape cartridge magazine 206 is in the process of being moved on to the shelf 220 in the direction of the arrow. The auxiliary memory reader 232 is shown transmitting an RF field 404 via an auxiliary radio frequency memory device 104 contained in cartridge A 402. Arrangement-B illustrates the auxiliary radio frequency memory device 104 contained in tape cartridge A 302 transmitting data, such as load count information relative the history of loads associated with cartridge A 402, in the form of an RF signal 406 to the auxiliary memory reader 232 when positioned in the presence of the RF field 404. In one embodiment of the present invention, the auxiliary radio frequency memory device 104 is a passive device because it is energized when subjected to a strong enough RF field produced by the auxiliary memory reader 232. Information is transmitted between the auxiliary radio frequency memory device 104 and the auxiliary memory reader 232 via a specific radio frequency, shown here as 404 and 406. Data can be transferred and stored on the auxiliary radio frequency memory device 104 from the library 200 or alternatively (and in addition to) data from the auxiliary radio frequency memory device 104 can be transferred to the auxiliary memory 240 via the auxiliary memory reader 232. Arrangement-C illustrates the auxiliary radio frequency memory device 104 contained in tape cartridge B 408 transmitting data in the form of an RF signal 407 to the auxiliary memory reader 232 when positioned in the presence of the RF field 404. Arrangement-D illustrates the auxiliary radio frequency memory device 104 contained in tape cartridge C 410 transmitting data in the form of an RF signal 409 to the auxiliary memory reader 232 when positioned in the presence of the RF field 404. The load information can be further stored on a magazine auxiliary memory device 253, of FIG. 2B, for every cartridge 100 populated in the magazine 206. In an optional embodiment, the auxiliary memory reader 232 can be linked with the processor device 241 and the auxiliary storage device 240, thus, providing load count information for comparison that can be used as an alternative to the auxiliary memory device reader and writer 230 described in FIG. 3C.

Figure 5:
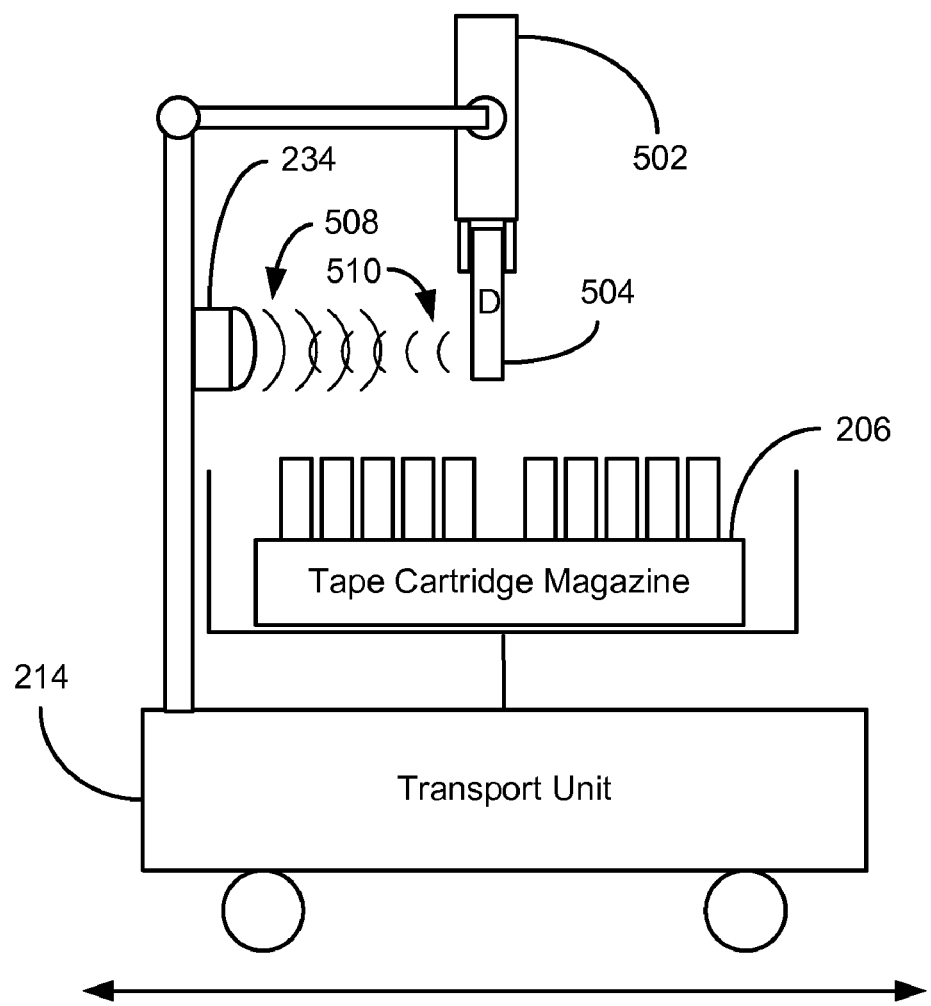
FIG. 5 is an illustration of a transport unit and auxiliary memory reader arrangement in accordance with an embodiment of the present invention.

With reference to FIG. 5, shown therein is an illustration of the transport unit 214, of FIG. 2A, in greater detail. The transport unit 214 is adapted to transport tape cartridge magazines 206 within the library 200. A cartridge picker 502, which can be associated with the transport unit 214, is adapted to move cartridges 100 from a tape cartridge magazine 206 into a cooperating read/write relationship with a tape drive, such as tape drive 224 of FIG. 2A. The transport unit 214 is illustratively shown herein accommodating an auxiliary memory reader 234 that is transmitting an RF signal 508 (and potentially data) to an auxiliary radio frequency memory device 104 contained in tape cartridge D 504 whereby the auxiliary radio frequency memory device 104 of cartridge D 504 is transmitting data, such as load count information, via an RF signal 510 to the auxiliary memory reader 234. In an optional embodiment, the auxiliary memory reader 234 can be linked with the processor device 241 and the auxiliary storage device 240, thus, providing load count information for comparison that can be used as an alternative to the auxiliary memory device reader and writer 230 described in FIG. 3C.

Figure 6:
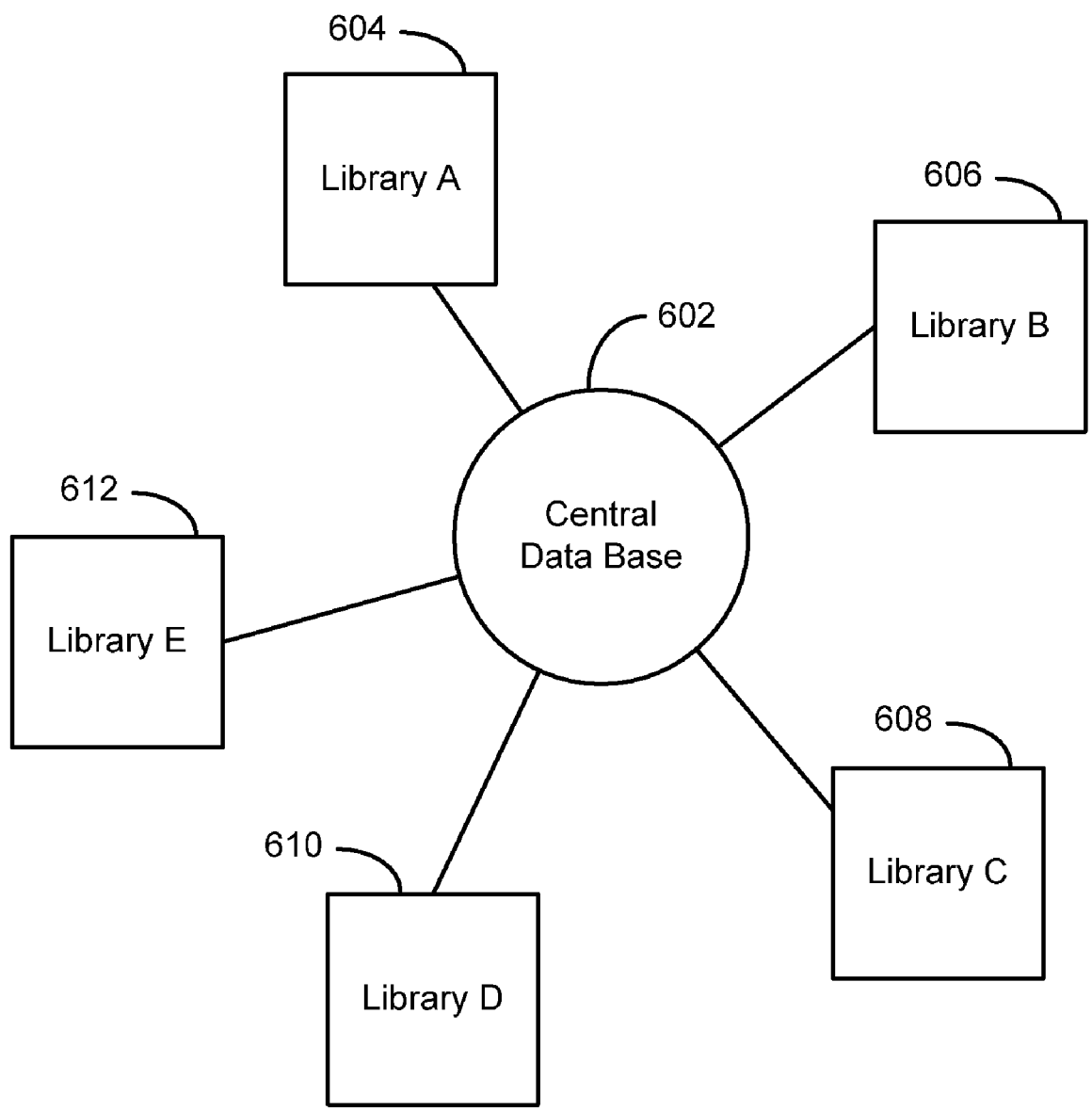
FIG. 6 is a block diagram illustrating a central data base acting as a repository for information pertaining to a plurality of tape cartridges in a plurality of libraries in accordance with an embodiment of the present invention.

FIG. 6 is a block diagram illustrating a central data base 602 acting as a repository for information pertaining to load counts for at least each tape cartridge associated with libraries A-E 604-612. As shown in the illustrative arrangement, library A 604, B 606, C 608, D 610 and E 612 are each linked to the central data base 602. The central data base 602 can provide storage of any, and all, auxiliary radio frequency memory device information, including all load counts associated with libraries A-E 604-612, contained in each tape cartridge associated with each library A-E 604-612. The central data base 602 can provide the function of the processor device 241 and auxiliary storage device 240 from FIGS. 3A-3C, thus generating a user specified action if a load count differs from those accounted for from any of the tape drives in any of the libraries A-E 604-612. In other words, all of the tape drives of libraries A-E 604-612 are known entities and therefore authorized to load and exchange data on tape cartridges from libraries A-E 604-612. Any loads that may have occurred outside of the authorized libraries A-E 604-612 raises a suspicion that data has been read or exchanged on a tape cartridge 100 from an unauthorized entity. Hence, a user specified action may alert a user of data that a tape cartridge data has been stolen or a suspicious tape cartridge has been re-introduced into the library network A-E 604-612 which may result in a virus or sabotage, for example. The auxiliary radio frequency memory device information stored on the central data base can be viewed by an authority, such as an Original Equipment Manufacturer of libraries and/or tapes, for purposes of tape management.

Figure 7:
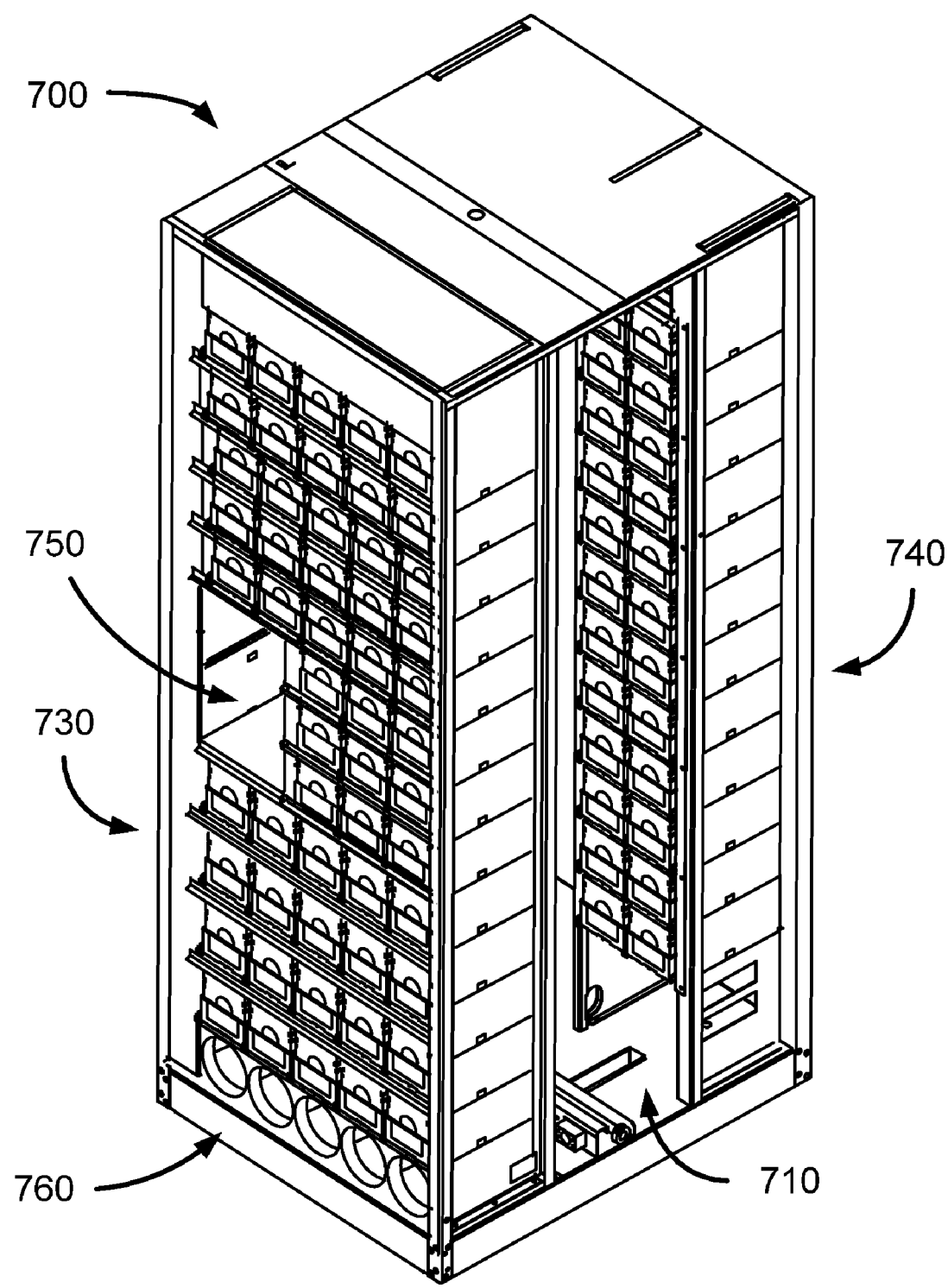
FIG. 7 shows a commercial embodiment of one T-950 library unit wherein aspects of the present invention can be practiced.
Figure 8:
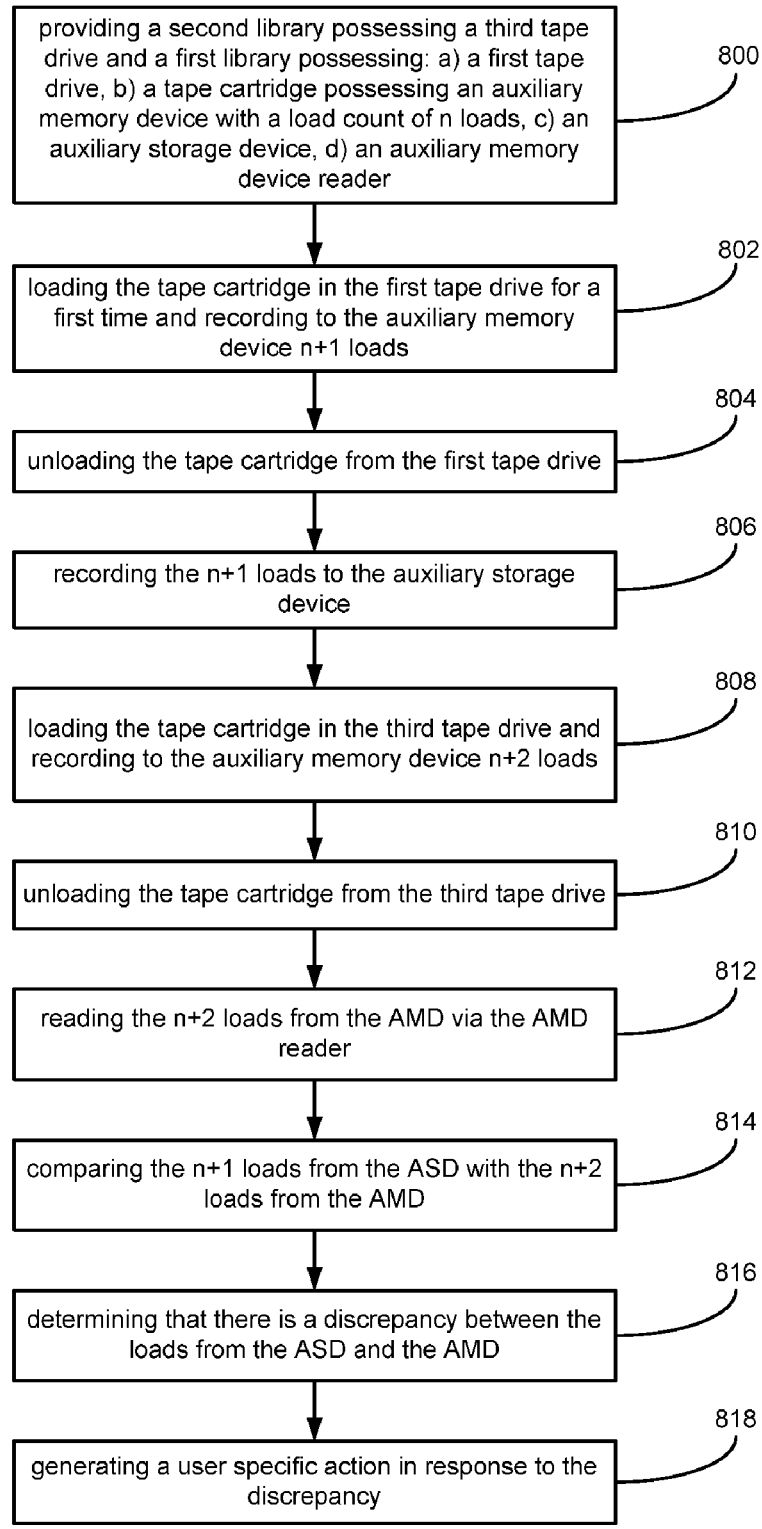
FIG. 8 is a block diagram illustrating a method to practice an embodiment of the present invention.

Embodiments of the present invention can be commercially practiced in a Spectra Logic T-950 tape cartridge library manufactured by Spectra Logic of Boulder Colo. FIG. 7 shows a commercial embodiment of one T-950 library unit 700 without an enclosure. The T-950 library 700 comprises a first and second shelf system 730 and 740 that are adapted to support a plurality of the mobile media, such as the tape cartridge magazine 206 comprising a plurality of LTO-3 tape cartridges with MAMs, archived by the library 700. The shelf systems 730 and 740 can each comprise at least one auxiliary memory reader, such as the auxiliary memory reader 232 of FIG. 2A. Disposed next to the second shelf system 740 are at least four IBM LTO-3 drives adapted to read and write data to and from a tape cartridge. The IBM LTO-3 drives each have the capability of storing data to an auxiliary radio frequency memory device 104 contained in an LTO-3 cartridge. Functionally interposed between the first and second shelf system 730 and 740 is a magazine transport space 710. The magazine transport space 710 is adapted to provide adequate space for a tape cartridge magazine 206 to be moved, via a magazine transport and cartridge picker (not shown), from a position in the first shelf system 730, for example, to a drive. The magazine transport and picker can further accommodate at least one auxiliary radio frequency memory device reader, such as the reader 234 from FIG. 2A. Tape cartridge magazines 206 can be transferred into and out from the T-950 library 700 via an entry/exit port 750. Transferring tape cartridge magazines 206 in and out of the T-950 library 700 can be accomplished by an operator for example. The T-950 library 700 comprises a means for cooling as shown by the fans 760, located at the base of the library 700. The T-950 library 700 can be linked to a central data base, such as the data base 602, wherein the central data base can provide storage of all of the auxiliary radio frequency memory devices, such as the device 104, contained in each tape cartridge in the T-950 library 700 as read by any one of the auxiliary radio frequency memory device readers. The T-950 library also comprises a library controller (not shown) that can function as the processor device 241 in addition to an auxiliary storage device 240, such as a disk drive (or plurality of disk drives), of FIGS. 3A-3C. The T-950 library 700 also provides a graphical user interface (not shown) whereon a display of load count data or in an alternative embodiment, simple messages pertaining a user specified action associated with a tape cartridge can be displayed, such as an alert accompanying a sound alarm, for example.

Referring now to FIG. 9 in conjunction with FIG. 3A-3C, shown therein is a method to practice an embodiment of the present invention. It should be recognized that the steps presented in the described embodiments of the present invention do not necessarily require any particular sequence unless otherwise stated. As shown in step 800, a first library 300 is provided with a first tape drive 224, a tape cartridge 201 that possesses an auxiliary memory device 104 with a load count of n loads, an auxiliary storage device 240 and an auxiliary memory device reader 230. In one embodiment, the number of loads is finite, such as fourty loads from a different tape drive in a different library. In this scenario, the tape cartridge may be introduced to the first drive 224 in the first library 300 for the first time. Alternatively, the tape cartridge may have zero loads registered in the load count, i.e., a new tape cartridge. Step 800 also provides a second library 301 possessing a third tape drive 302. As shown in step 802, the tape cartridge 201 is loaded in the first tape drive 224 and "n+1" loads is recorded to the auxiliary memory device 104. In an alternative embodiment, the tape cartridge 201 is loaded in the first tape drive 224 for a first time and "n+1" loads is recorded to the auxiliary memory device 104. In this alternative embodiment, a tape with prior history can be introduced to the library 300 for a first time without concern of user data being tampered with because no user data has yet been stored on the tape cartridge. Optionally, when any tape cartridge is introduced to the first library 300 for the first time, the tape cartridge possessing indicia, such as a bar code, is logged into a data base within the first library 300, such as in the auxiliary storage device 240, for example. As shown in step 804, the tape cartridge 201 is unloaded from the first tape drive 224. As shown in step 806, "n+1" loads is recorded to the auxiliary storage device 240. As shown in step 808, the tape cartridge is loaded in the third tape drive and "n+2" loads is recorded to the auxiliary memory device 104. As shown in step 810, the tape cartridge is unloaded from the third tape drive 302. As shown in step 812, the "n+2" loads are read from the auxiliary memory device 114 via the auxiliary memory device reader and writer 230. As shown in step 814, the "n+1" loads from the auxiliary storage device is compared with the "n+2" loads from the auxiliary memory device. As shown in step 816, a discrepancy is determined between the loads from the auxiliary storage device and the auxiliary memory device. As shown in step 818, a user specified user specified action is generated in response to the discrepancy. A user specified action can contain a notification, such as an alert that the tape cartridge has been used by at least one drive outside of the first library 300. In one embodiment, such an alert can be viewable to an end user, such as a user of data 202, on a display monitor for example. Optionally, the user specified action can contain a "do-not-load" command that prevents the tape cartridge 201 from fully loading (threading the media) in any tape drive associated with the first library 300. In yet another alternative embodiment, the user specified action can contain a "library-lock" command that prevents the tape cartridge 201 from being removed from the first library 300 without authorization from an authority. A "library-lock" command can be accomplished by locking a door over the entry/exit port 204 or locking any cartridge transport device, etc. It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple auxiliary memory reader devices independent of a tape drive can be used inside of a library with one or more tape cartridge's associated auxiliary memory device at the same time while still maintaining substantially the same functionality relative load count and interaction with the auxiliary memory device 240 without departing from the scope and spirit of the present invention. Another example can include using multiple tape drives that share knowledge of load count for a common tape cartridge will not generate a miscompare relative load counts, thus multiple drives, either stand-alone or within different libraries can be used together while still maintaining substantially the same functionality without departing from the scope and spirit of the present invention. Another example can include using auxiliary memory reader devices independent of a tape drive to check accuracy of data via redundancy not to mention techniques in which data from multiple tape cartridges, via their associated auxiliary memory devices, can be accumulated coincidentally, just to name a few examples while still maintaining substantially the same functionality without departing from the scope and spirit of the present invention. Further, though elements and methods are described herein exemplifying a first and second object or element, for example, this language is used herein to simplify the description indicative of a plurality of objects or elements. Finally, although the preferred embodiments described herein are directed to tape library systems, RF devices, SCD tape drives and related technology, it will be appreciated by those skilled in the art that the teachings of the present invention can be applied to other remote communication systems and devices, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A method comprising steps of:
providing a second library possessing a second tape drive and a first library possessing: a) a first tape drive, b) a tape cartridge possessing an auxiliary memory device with a load count of n loads, c) an auxiliary storage device, and d) an auxiliary memory device reader;
a) loading said tape cartridge in said first tape drive;
b) recording into said auxiliary memory device a first load count of n+1 loads;
c) unloading said tape cartridge from said first tape drive;
d) recording said first load count into said auxiliary storage device;
e) loading said tape cartridge in said second tape drive;
f) recording into said auxiliary memory device a second load count of n+2 loads;
g) unloading said tape cartridge from said second tape drive;
h) reading said second load count from said auxiliary memory device via said auxiliary memory device reader;
i) comparing said first load count from said auxiliary storage device with said second load count from said auxiliary memory device;
j) determining whether there is a numerical discrepancy between said first and second load counts from said auxiliary storage device and said auxiliary memory device;
k) generating a user specified action via said first library in response to said any discrepancy.

2. The method of claim 1 wherein said n loads is a finite number of loads from at least one tape drive other than said first tape drive.

3. The method of claim 1 wherein said n loads is zero.

4. The method of claim 1 wherein said tape cartridge further possesses cartridge indicia.

5. The method of claim 4 wherein said tape cartridge is made known to said first library via said cartridge indicia when said cartridge is first introduced to said first library.

6. The method of claim 1 wherein said user specified action is a notification of said discrepancy that is transmitted to a display viewable by an end user.

7. The method of claim 6 wherein said notification contains an alert that said tape cartridge has been used by at least one drive outside of said first library.

8. The method of claim 1 wherein said first tape drive possesses said auxiliary memory device reader.

9. The method of claim 1 wherein said loading step provides that said tape cartridge is loaded in said first tape drive for a first time and said auxiliary memory device is recorded with said first load count of n+1 loads.

10. The method of claim 1 wherein said user specified action contains a do-not-load command preventing said tape cartridge from being loaded in said first tape drive.

11. The method of claim 1 wherein said user specified action contains a library-lock command preventing said tape cartridge from being removed from said first library without authorization from an authority.

12. The method of claim 1 wherein said first library possesses a third tape drive that increases said loads in said auxiliary memory device by an increment of one when said tape cartridge is loaded in said third drive, and wherein said auxiliary storage device maintains knowledge of said load count of said first and said third tape drives.

13. A tape library comprising:
at least one library tape drive;
a tape cartridge possessing an auxiliary memory device, said auxiliary memory device adapted to maintain a total load count, which includes a library load count of every time said tape cartridge is loaded in said at least one library tape drive and an external load count of every time said tape cartridge is loaded in any other tape drive that is located outside of said tape library;
an auxiliary storage device adapted to maintain knowledge of said library load count;
an auxiliary memory device reader capable of reading said total load count from said auxiliary memory device;
a processing device adapted to compare said total load count from said tape cartridge with said library load count from said auxiliary storage device, and if said total load count is different from said library load count, transmit a notification to an end user that can access said tape library of said difference between said library load count and said total load count.

14. The library of claim 13 wherein said notification contains information that said tape cartridge has been read by an external tape drive that is not associated with said tape library.

15. The library of claim 14 wherein said notification is viewable on a display device.

16. The library of claim 13 wherein said processing device is capable of preventing said tape cartridge from being loaded on said at least one library tape drive.

17. A tape library comprising:
a first tape drive and a second tape drive;
a tape cartridge possessing an auxiliary memory device adapted to maintain a load count that is incremented whenever said tape cartridge is loaded in said first tape drive, said second tape drive or a third tape drive independent of said tape library;
a means for maintaining knowledge of said load count from said first tape drive and said second tape drive;
a means for comparing said knowledge with said load count from said auxiliary memory device;
a means for generating a user specified action when said knowledge is not identical to said load count from said auxiliary memory device; and
a means for executing said user specified action.

18. The tape library of claim 17 wherein said specified action is selected from the group consisting of: preventing said tape cartridge from being loaded in said first or said second tape drive, preventing said tape cartridge from leaving said library, informing an end user that said knowledge is not identical to said load count from said auxiliary memory device, disabling any user data stored on said tape cartridge, activating an alarm.

19. The tape library of claim 17 further comprising a second tape cartridge that is substantially identical to said tape cartridge and is subject to said means for maintaining knowledge, said means for comparing, said means for generating and said means for executing.

20. The tape library of claim 17 wherein said means for executing said user specified action is transmitting a notification to a user of data displayable on a display device.

* * * * *